(12) United States Patent
Lee

(10) Patent No.: US 11,612,453 B2
(45) Date of Patent: Mar. 28, 2023

(54) DENTAL IMPLANT GUIDING TOOL SET AND DENTAL IMPLANT GUIDING SLEEVE THEREOF

(71) Applicant: Joy International Co., Taipei (TW)

(72) Inventor: Ping-Cheng Lee, Taipei (TW)

(73) Assignee: JOY INTERNATIONAL CO., Taipei (TW)

( * ) Notice: Subject to any disclaimer, the term of this patent is extended or adjusted under 35 U.S.C. 154(b) by 197 days.

(21) Appl. No.: 16/544,339

(22) Filed: Aug. 19, 2019

(65) Prior Publication Data
US 2021/0022829 A1     Jan. 28, 2021

(30) Foreign Application Priority Data

Jul. 23, 2019    (TW) ................................ 108126059

(51) Int. Cl.
*A61C 1/08*     (2006.01)
*A61C 8/00*     (2006.01)
(52) U.S. Cl.
CPC ............ *A61C 1/084* (2013.01); *A61C 8/0089* (2013.01)
(58) Field of Classification Search
CPC ....... A61C 1/084; A61C 8/0089; A61C 19/04; A61C 1/082; A61C 1/08; A61C 1/00; A61C 8/00
USPC ..................................................... 433/75, 72
See application file for complete search history.

(56) References Cited

U.S. PATENT DOCUMENTS

| | | | |
|---|---|---|---|
| 3,088,745 A | 5/1963 | Staunt | |
| 8,585,402 B2 | 11/2013 | Vogel et al. | |
| 2010/0297574 A1* | 11/2010 | Llop | A61C 8/0089 433/75 |

FOREIGN PATENT DOCUMENTS

| | | | |
|---|---|---|---|
| CN | 102379747 A | 3/2012 | |
| JP | H-01166755 | 6/1989 | |
| JP | 4942120 B2 | 3/2012 | |
| KR | 10-1631261 B1 | 6/2016 | |
| WO | WO-2007104842 A1 * | 9/2007 | ............. A61C 1/084 |

(Continued)

OTHER PUBLICATIONS

Caillon, English translation of the specification of WO 2007104842 A1 (Year: 2007).*

(Continued)

*Primary Examiner* — Ralph A Lewis
*Assistant Examiner* — Mirayda A Aponte
(74) *Attorney, Agent, or Firm* — Muncy, Geissler, Olds & Lowe, P.C.

(57) ABSTRACT

A dental implant guiding tool set and a dental implant guiding sleeve thereof are disclosed. The dental implant guiding tool set includes a handpiece, a dental implant guiding sleeve and a tooth mold fastening device. The dental implant guiding sleeve includes a handpiece head guiding hole disposed axially and corresponding to a shape of the handpiece head of the handpiece, a lateral opening disposed on a side of the handpiece head guiding hole and corresponding to a connection handle of the handpiece. The dental implant guiding sleeve can directly guide the handpiece head of the handpiece, to prevent the dental implant guiding sleeve from directly contacting the drill bit mounted on the handpiece. Therefore, a conventional drill bit can be directly used for a guiding dental implant operation, and the minimal required operation space of the dental implant guiding tool set can be reduced.

7 Claims, 9 Drawing Sheets

(56) References Cited

FOREIGN PATENT DOCUMENTS

| WO | WO-2010/025191 A1 | 3/2010 | | |
| WO | WO-2010025191 A1 | * | 3/2010 | ............. A61C 1/084 |

OTHER PUBLICATIONS

Extended European Search Report dated Oct. 8, 2020 in EP Application No. 20186077.2 (7 pages).
Taiwanese Examination Report which corresponds to Application No. 108126059; dated Jan. 13, 2020.

\* cited by examiner

DENTAL IMPLANT GUIDING TOOL SET AND DENTAL IMPLANT GUIDING SLEEVE THEREOF

This application claims priority for Taiwan patent application no. 108126059 filed on Jul. 23, 2019, the content of which is incorporated by reference in its entirely.

BACKGROUND OF THE INVENTION

1. Field of the Invention

The present invention relates to an apparatus for a dentist, and more particularly to a tool set for dental implant and an assembly thereof.

2. Description of the Related Art

A dental implant operation is a tooth replacement technique for implanting an implant into alveolar bone, and then installing an artificial tooth to fix missing tooth. One of the key devices affecting the effect of dental implant is a handpiece, which is also called a dental handpiece.

Please refer to FIG. 1, which is a schematic view of a conventional dental implant device. Before implant installation, a dentist must first drill, or ream and grind a hole on alveolar bone 100, to facilitate subsequent implant operations. In a conventional drilling method, a user installs an appropriate drill bit 102 on the handpiece 101 first, and then holds the handpiece 101 to directly drill the alveolar bone 100 at a drilling place. An operational position of the dental implant process is in a mouth of the human body and there are other teeth 103 on both sides of the drilling place, the operating space is quite limited, and the drill bit 102 of the handpiece 101 is also rotating fast during operation, so it is easy to occur undesired conditions in the drilling process, for example, the drill bit 102 drills at an inaccurate position, or the drill bit 102 skews or shakes to causes improper reaming. The undesired condition possibly affects the sequential implant process, and further causes an implant result to be not as good as expected, and the implant result possibly derives many problems.

In order to solve the problem that the drill bit 102 possibly drills at an inaccurate position and the drill bit 102 skews during the dental implant process, a guiding implanting technology is developed. Please refer to FIG. 2, which is a schematic view of a conventional guiding implanting device. A tooth mold fastener 200 (also called a guiding plate) is disposed on a drilling place in advance, and configured to fasten with peripheral teeth. The tooth mold fastener 200 can provide a drill bit guiding hole 201 corresponding in position to the drilling place. A special drill bit 300 is mounted on the handpiece 101. The difference between the special drill bit 300 and the conventional drill bit 102 is that the special drill bit 300 has a convex part 302 disposed behind the drill head 301 thereof and having a half diameter higher than that of the drill head 301. The drill bit guiding hole 201 has a convex hole 202 corresponding in position to the convex part 302. The configuration of the convex hole 202 and the drill bit guiding hole 201 can be used to limit the special drill bit 300 to have an axial displacement only, so as to prevent the handpiece 101 connected to the end of the special drill bit 300 from being shifted or skewed. Secondly, the special drill bit 300 includes a stop block 303 disposed thereon, and the drill bit guiding hole 201 has a stop step 203 corresponding in position to the stop block 303, so that the configuration of the stop block 303 and the stop step 203 can limit a drilling depth of the drill head 301 of the special drill bit 300, thereby ensuring accuracy and safety of the dental implant operation. In actual implementation, in order to prevent the fast-rotating special drill bit 300 from excessive wearing the drill bit guiding hole 201, a pad or bush made of metal material can be disposed in the drill bit guiding hole 201, so as to solve the problem that the drill bit guiding hole 201 is worn and deformed.

However, the implementation of the special drill bit 300 has following problems. First, the special drill bit 300 with the convex part 302 greatly increases a manufacturing cost of the drill bit. Secondly, the dentist must prepare both of the conventional drill bit set and the special drill bit set for dental implant operation, and it results in an increase in medical costs. The configuration of the special drill bit 300 and the drill bit guiding hole 201 can stabilize the operating direction of the special drill bit 300, but it causes the problem of greatly increasing the working space required for dental implanting operation, especially a total working distance from a rear end of the handpiece head of the handpiece 101 to a tip of the drill head 301. When the implanting part is close to rear teeth, a possible opening distance between an upper jaw and a lower jaw of the human body is limited, and insufficient distance makes it difficult to perform the guiding dental implant operation, and the dentist must change to use the conventional drill bit 102 (as shown in FIG. 1) to perform conventional dental implant operation on the rear tooth because it is difficult to perform the guiding dental implant operation on the rear tooth.

The use of the special drill bit 300 also has the following problems. During operation, the special drill bit 300 is rotating fast and possibly produces improper friction between the convex part 302 and the convex hole 202, and between the stop block 303 and the stop step 203, and it consumes excessive driving power provided by the handpiece 101; furthermore, the special drill bit 300 generates high temperature during operation, but an outer wall of the drill bit guiding hole 201 blocks the cooling water sprayed from a spray hole 104 of the handpiece 101, so it causes the problem that the special drill bit 300 is not easily lubricated and cooled.

Secondly, the configuration of the convex part 302 and the convex hole 202 can prevent the special drill bit 300 from being shifted and skewed, but the convex part 302 also becomes a forced position of the special drill bit 300 for resisting a lateral external force; in other words, all unstable forces of the hand-held handpiece 101 are transferred to the middle section of the special drill bit 300, it causes the special drill bit 300 to be easily damaged, and the convex part 302 and the stop block 303 easily become break points of the special drill bit 300.

For this reason, the present invention provides a dental implant guiding tool set and a dental implant guiding sleeve thereof, to solve the conventional technical problems and further improve the implementation of the guiding dental implant technology, so that the conventional dental implant drill bit can be directly used for guiding dental implant operation.

SUMMARY OF THE INVENTION

An objective of the present invention is to provide a dental implant guiding tool set, to enable a general implant drill bit to be directly used for guiding dental implant operation, and to effective reduce the required operation space, thereby making the dental implant operation easier, safer and more comfortable. In order to achieve the objective, the dental implant guiding tool set of the present invention comprises a handpiece, a dental implant guiding sleeve, and a tooth mold fastening device. The handpiece includes a replaceable drill bit and a handpiece head configured to provide the drill bit with driving power, a connection handle connected to the handpiece head. The dental implant guiding sleeve has a handpiece head guiding hole corresponding to a shape of the handpiece head and disposed axially, at least one lateral opening formed on a side of the handpiece head guiding hole and corresponding in position to the connection handle, two locating plates radially disposed on two outer sides thereof, and a position-limiting plate disposed on a bottom of the handpiece head guiding hole and having a drill bit through hole formed on a center thereof. The tooth mold fastening device includes a sleeve hole corresponding to the dental implant guiding sleeve and configured for insertion of the dental implant guiding sleeve, and two locating accommodation spaces formed on two sides of the sleeve hole and corresponding to the two locating plates.

By the above technical solution, the handpiece head can be located through the handpiece head guiding hole and limited to have the axial displacement only, so that the drilling position of the drill bit can be precisely controlled; furthermore, the handpiece head contacts the handpiece head guiding hole by a non-rotating outer part thereof, so only sliding friction occurs between the handpiece head and the handpiece head guiding hole during the axial displacement of the handpiece head, thereby preventing the fast rotary friction occurred in the conventional guiding dental implanting device and high heat. The configuration of the two locating plates and the two locating accommodation spaces can fasten the dental implant guiding sleeve on the tooth mold fastening device fast and stably, and also can effectively prevent the dental implant guiding sleeve from being affected by the handpiece head to fall off the tooth mold fastening device when the handpiece head is axially moved in the handpiece head guiding hole.

Secondly, since the drill bit is not direct contact with the dental implant guiding sleeve, it can prevent the middle part of the drill bit from being subjected to an improper force, and the displacement and deflected force of the handpiece can be directly applied to between the handpiece head and the handpiece head guiding hole, and then be eliminated, so as to protect the drill bit well. The lateral opening can make the handpiece head enter the handpiece head guiding hole deeper, and the cooling water sprayed from the spray hole of the handpiece can be sprayed to the drill bit through the lateral opening, so as to ensure the drill bit to be lubricated and cooled during operation. The position-limiting plate has the drill bit through hole disposed thereon, so that the position-limiting plate contacts the non-rotating handpiece head only and does not interfere with the operation of the drill bit. When the drill bit starts to enter the handpiece head guiding hole, the drill bit through hole can appropriately limit, guide and align the front end of the drill bit.

In an embodiment of the dental implant guiding tool set, the dental implant guiding sleeve can include at least one reinforcing rib disposed on an outer edge thereof and configured to strengthen structural intensity of the dental implant guiding sleeve. The tooth mold fastening device can wrap a partial area of the reinforcing rib to prevent the dental implant guiding sleeve from being deformed easily; in an embodiment, the two locating plates can be disposed on the same or difference horizontal heights, so as to fit with teeth near the dental implant position and having different heights; in an embodiment, the dental implant guiding sleeve can be formed by metal material, to make the dental implant guiding sleeve sturdier and more durable for repeatedly use.

Another objective of the present invention is to provide a dental implant guiding sleeve which can be in cooperation with the handpiece alone or in cooperation with both of the handpiece and the tooth mold fastening device in the dental implant guiding operation, so as to effectively reduce the required operating space and make the dental implant operation easier, safer and more comfortable. In order to achieve the objective, the dental implant guiding sleeve of the present invention comprises a handpiece head guiding hole disposed axially and configured for insertion of the handpiece head, and having an aperture size corresponding to the handpiece head shape, at least one lateral opening disposed on a side of the handpiece head guiding hole, and a position-limiting plate disposed on a bottom of the handpiece head guiding hole. The position-limiting plate includes a drill bit through hole disposed on a center thereof. By the aforementioned technical solution, the handpiece head can be located by the handpiece head guiding hole, and limited to have axial displacement only, so that the drilling position of the drill bit can be precisely controlled; furthermore, the handpiece head contacts the handpiece head guiding hole by the non-rotating outer part thereof, so only sliding friction occurs during the axial displacement, and the fast rotary friction of the conventional guiding dental implanting device does not occur, and high heat is not generated.

The aforementioned dental implant guiding sleeve can comprise the two locating plates radially disposed on two outer sides of the dental implant guiding sleeve respectively, and configured to enable the dental implant guiding sleeve to be fast and securely attached to other components or to the periphery of the drilling position.

In an embodiment of the dental implant guiding sleeve, the dental implant guiding sleeve can comprise the at least one reinforcing rib disposed on an outer edge thereof and configured to strengthen structural intensity of the dental implant guiding sleeve; in an embodiment, the two locating plates can be disposed on the same or difference horizontal heights to fit with teeth near the dental implant position and having different heights; In an embodiment, the dental implant guiding sleeve can be formed by metal material, to make the dental implant guiding sleeve sturdier and more durable.

Compared to the conventional technologies, the present invention provides the dental implant guiding tool set and a dental implant guiding sleeve thereof to directly guide the handpiece head of the handpiece, so as to prevent the dental implant guiding sleeve from directly contacting the drill bit mounted on the handpiece, and it does not need to use the dedicated drill bit with the special guiding design. As a result, the conventional drill bit can also be directly used for guiding dental implant operation, and the operation cost can be decreased, and the minimal required operation space of the dental implant guiding tool set can be reduced, thereby making the operation of the drill bit more stable and secure.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
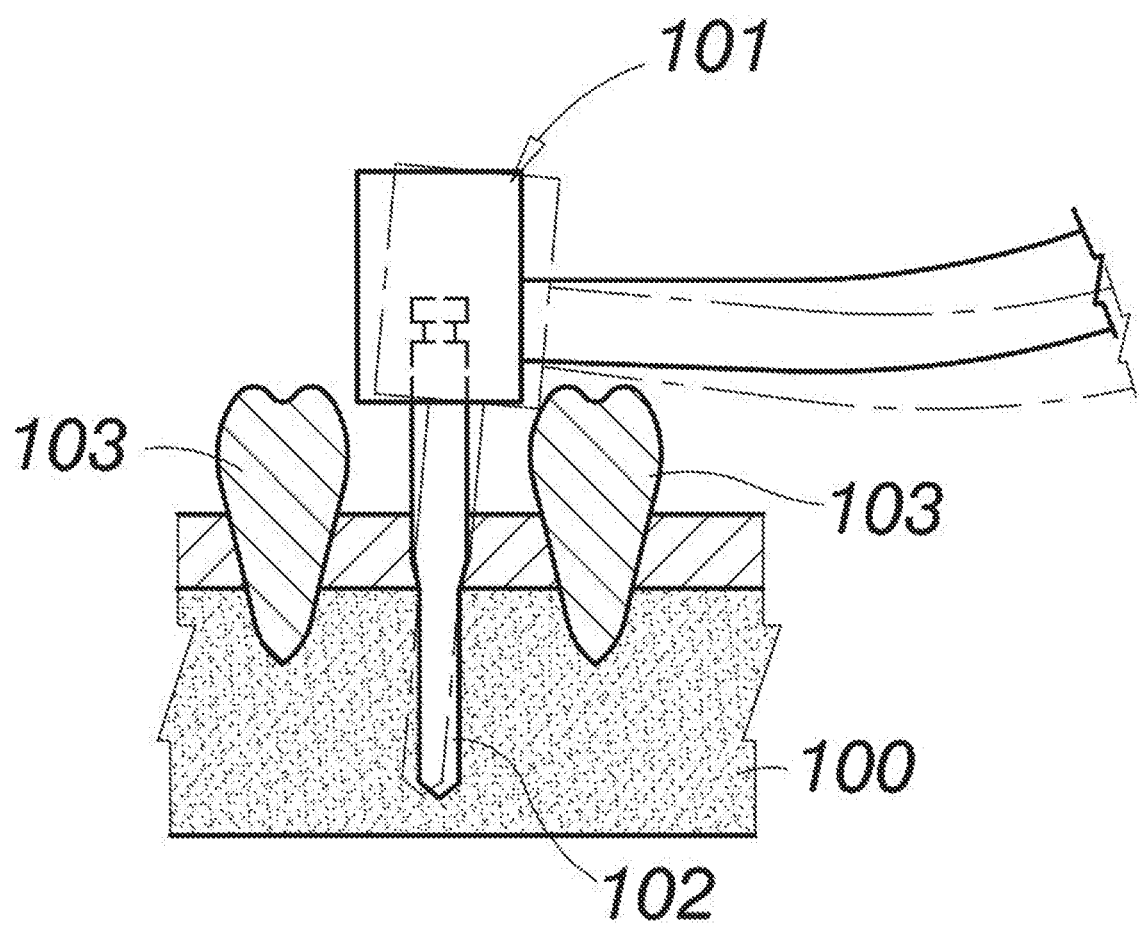
FIG. 1 is a schematic view of a conventional dental implanting device.
Figure 2:
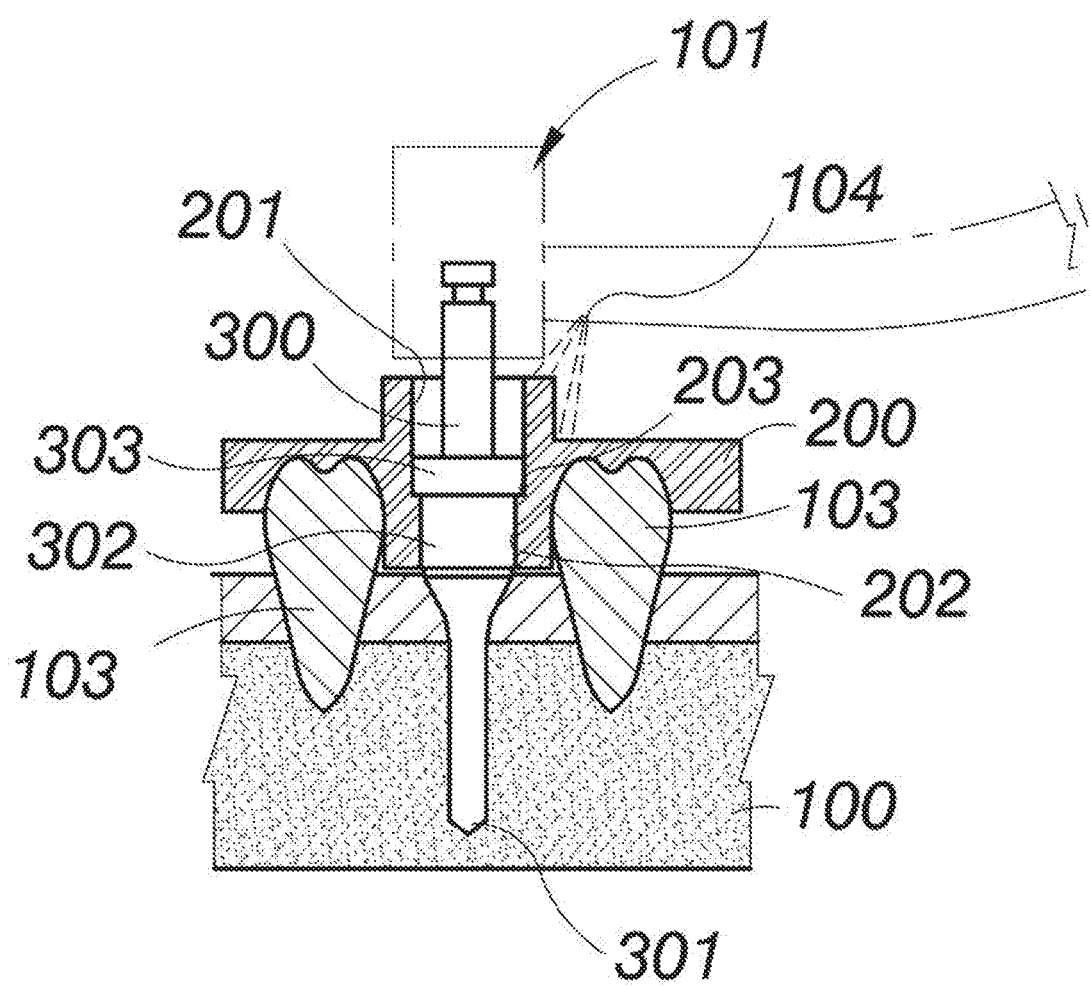
FIG. 2 is a schematic view of a conventional guiding dental implanting device.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 3:
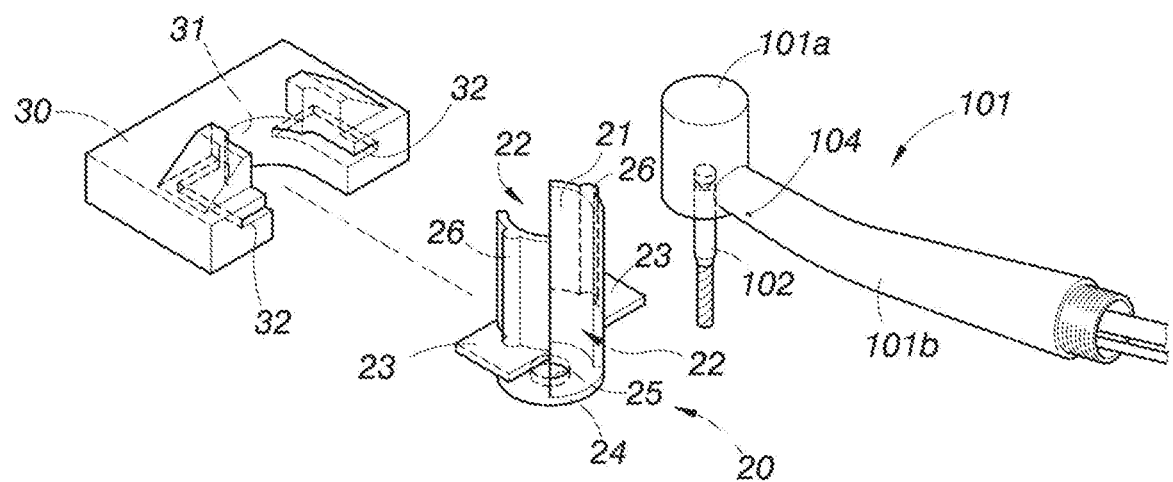
FIG. 3 is a perspective exploded view of a first embodiment of the present invention.
Figure 4:
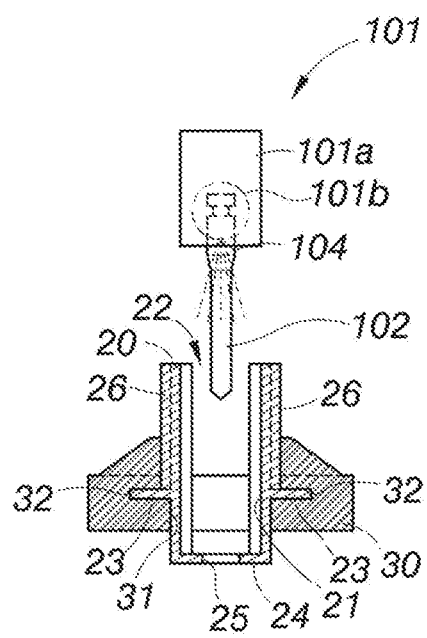
FIG. 4 is a sectional view of the first embodiment of the present invention.
Figure 5:
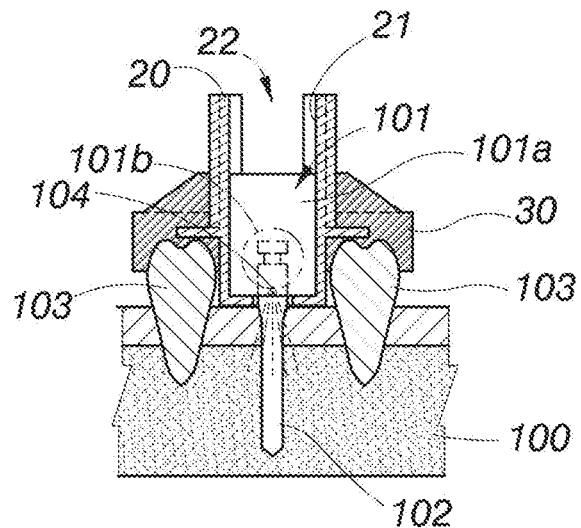
FIG. 5 is a schematic view of a drilling operation of a dental implant process of the first embodiment of the present invention.

Please refer to FIGS. 3 to 5, which show a first embodiment of the present invention. A dental implant guiding tool set of the present invention includes a handpiece 101, a dental implant guiding sleeve 20 and a tooth mold fastening device 30.

The handpiece 101 comprises a handpiece head 101a having a replaceable drill bit 102 and configured to provide the drill bit 102 with driving power, and a connection handle 101b connected to the handpiece head 101a.

The dental implant guiding sleeve 20 includes a handpiece head guiding hole 21 corresponding to a shape of the handpiece head 101a and disposed axially, at least one lateral opening 22 disposed on a side of the handpiece head guiding hole 21 and corresponding in position to the connection handle 101b, two locating plates 23 radially disposed on two outer sides of the dental implant guiding sleeve 20 respectively, and a position-limiting plate 24 disposed on a bottom of the handpiece head guiding hole 21 and having a drill bit through hole 25 formed on a center thereof. The dental implant guiding sleeve 20 comprises at least one reinforcing rib 26 disposed on an outer edge thereof and configured to strengthen structural intensity of the dental implant guiding sleeve 20. In this embodiment, the dental implant guiding sleeve 20 has two lateral openings 22 opposite to each other. In actual implementation, the lateral opening(s) 22 can be disposed on one side or both sides of the dental implant guiding sleeve 20 according to the use requirements. The dental implant guiding sleeve 20 can be made by metal material, to make the dental implant guiding sleeve 20 sturdier and more durable for repeatedly use.

The tooth mold fastening device 30 comprises a sleeve hole 31 corresponding to the dental implant guiding sleeve 20 and configured for insertion of the dental implant guiding sleeve 20, two locating accommodation spaces 32 formed on two sides of the sleeve hole 31 and corresponding in position to the two locating plates 23. The tooth mold fastening device 30 can wrap a partial area of the reinforcing rib 26, to prevent the dental implant guiding sleeve 20 from being deformed easily.

When the handpiece 101 is operated, the handpiece head 101a is located by the handpiece head guiding hole 21, and limited to have axial displacement only in the handpiece head guiding hole 21, so that the drilling position of the drill bit 102 can be precisely controlled. Since the handpiece head 101a does not rotate, only sliding friction occurs during the axial displacement of above-mentioned operation, so as to prevent unnecessary excessive friction and abrasion and high heat during the operation.

In a first embodiment, with the configuration of the two locating plates 23 disposed radially and the locating accommodation spaces 32 having the openings arranged in a radial direction, the dental implant guiding sleeve 20 can be laterally inserted to fast and stably fasten on the tooth mold fastening device 30, and when the handpiece head 101*a* is axially moved in the handpiece head guiding hole 21, the dental implant guiding sleeve 20 can be effectively prevented from being affected by the handpiece head 101*a* to fall off the tooth mold fastening device 30.

Since the drill bit 102 is not direct contact with the dental implant guiding sleeve 20 and the handpiece head guiding hole 21, the middle section of the drill bit 102 is not subjected to an improper external force, and the displacement and deflected force caused by the handpiece 101 can be directly applied to between the handpiece head 101*a* and the handpiece head guiding hole 21, and then be eliminated, so as to protect the drill bit 102 well to perform drilling, reaming or grinding operation on the alveolar bone 100.

The lateral opening 22 enables the handpiece head 101*a* to enter the handpiece head guiding hole 21 deeper, and the drill bit 102 can be in contact with or located in the handpiece head guiding hole 21 without using any additional structure, so that the required space of the entire implant drilling operation can be greatly reduced and the dental implant operation can be more widely applied in more parts of the mouth, for example, it facilitates to perform the dental implant operation on the rear tooth. Furthermore, the cooling water sprayed from the spray hole 104 of the handpiece 101 can be sprayed to the drill bit 102 through the lateral opening 22, so as to ensures the drill bit 102 to be lubricated and cooled during the operation.

The position-limiting plate 24 has the drill bit through hole 25, so that the position-limiting plate 24 only contact the non-rotating handpiece head 101*a* and does not interfere with the operation of the drill bit 102. When the drill bit 102 starts to enter the handpiece head guiding hole 21, the through hole of the drill bit 102 can properly limit, guide and align the front end of the drill bit 102.

In use, the dental implant guiding sleeve 20 can be in cooperation with the tooth mold fastening device 30, and also can be used alone in the drilling position for dental implant, so as to directly guide the handpiece head 101*a*.

Figure 6:
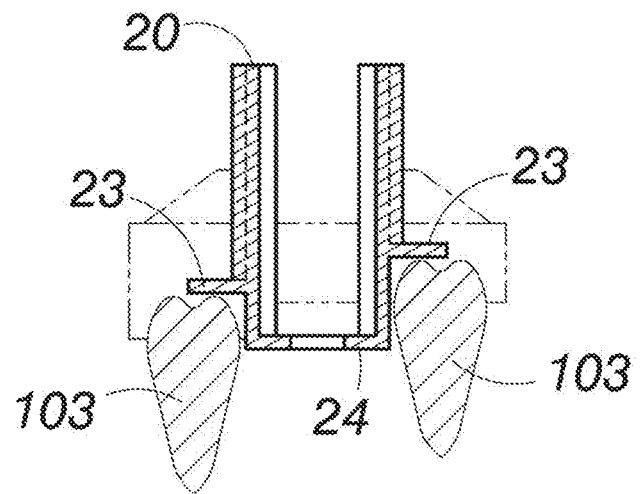
FIG. 6 is a schematic view of an implementation type of a dental implant guiding sleeve of the first embodiment of the present invention.
Figure 7:
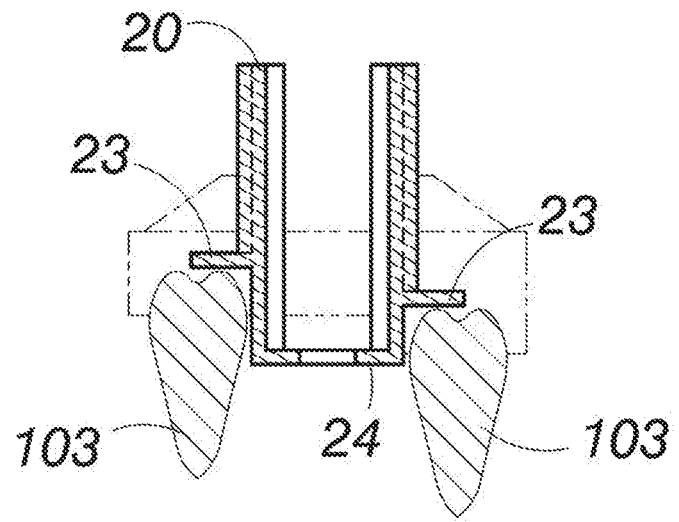
FIG. 7 is a schematic view of another implementation type of the dental implant guiding sleeve of the first embodiment of the present invention.
Figure 8:
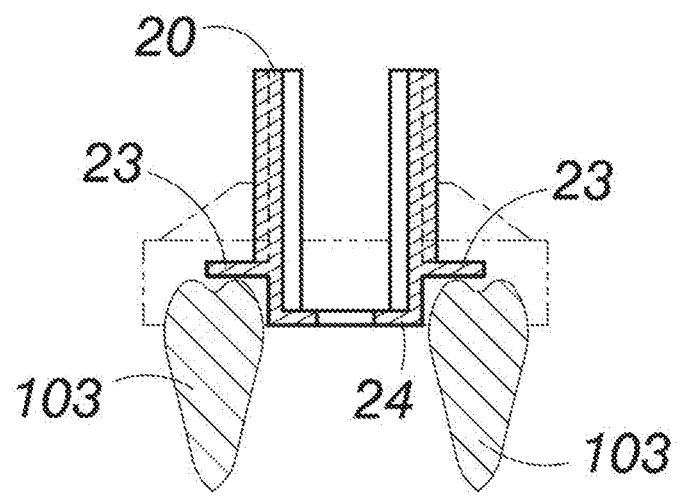
FIG. 8 is a schematic view of another implementation type of the dental implant guiding sleeve of the first embodiment of the present invention.
Figure 9:
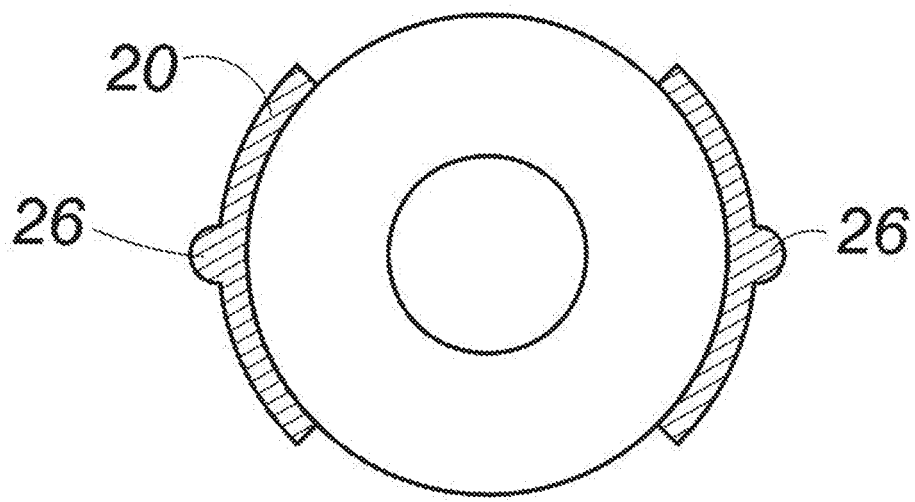
FIG. 9 is a schematic view of an implementation type of a reinforcing rib of the first embodiment of the present invention.
Figure 10:
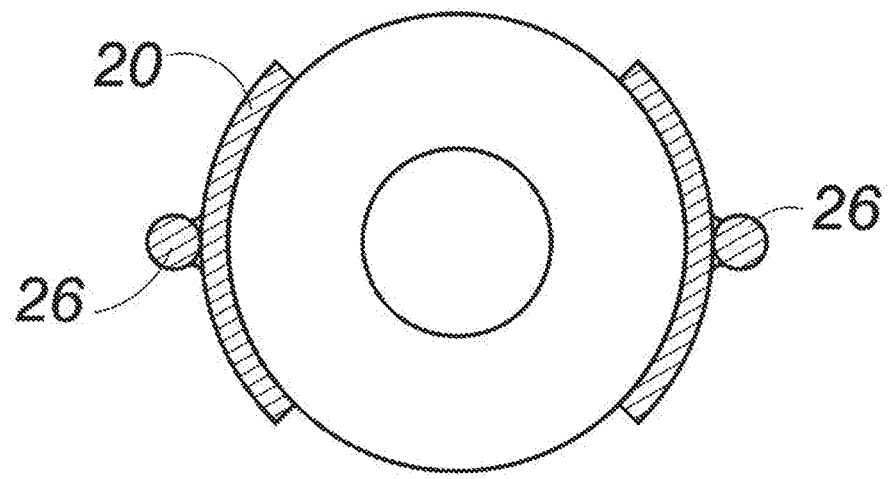
FIG. 10 is a schematic view of another implementation type of the reinforcing rib of the first embodiment of the present invention.
Figure 11:
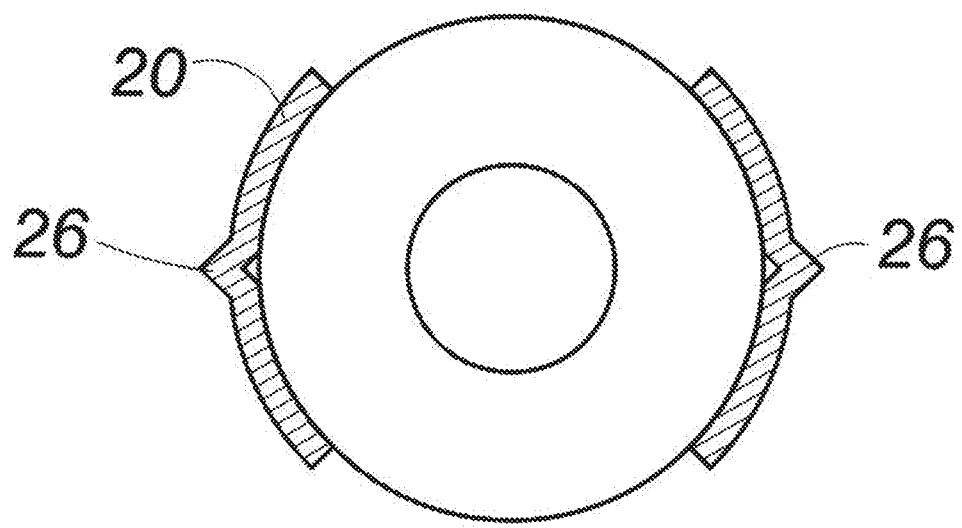
FIG. 11 is a schematic view of another implementation type of the reinforcing rib of the first embodiment of the present invention.
Figure 12:
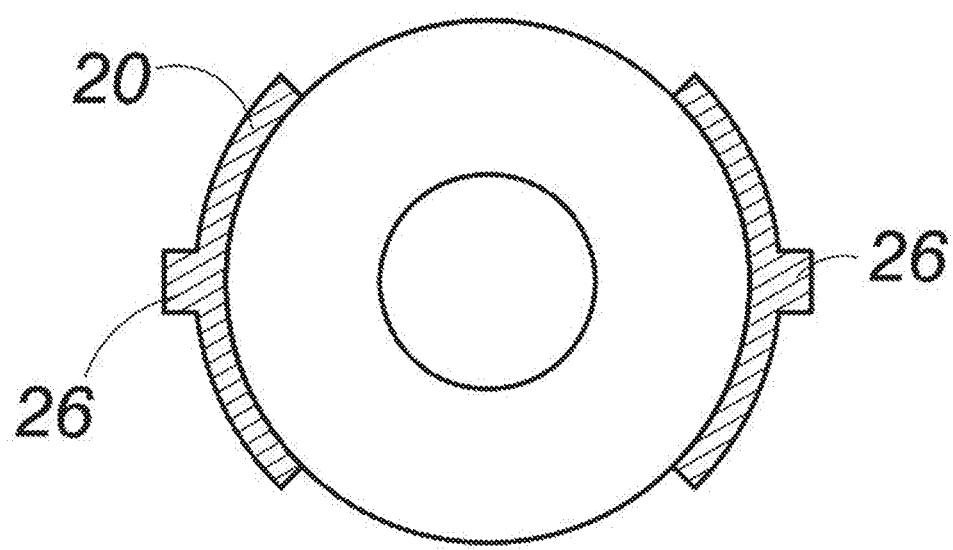
FIG. 12 is a schematic view of another implementation type of the reinforcing rib of the first embodiment of the present invention.

Please refer to FIGS. 6 to 8. The dental implant operation may be performed on different position, and the teeth near the drilling position possibly have different heights. In an embodiment, in order to fit the periphery teeth having different heights, the two locating plates of the dental implant guiding sleeve 20 can be disposed in the same or different levels, and the depth of the position-limiting plate 24 can be different according to the use requirement. In practical use, various types of the dental implant guiding sleeves 20 can be prepared for a dentist to select in different situation.

Please refer to FIGS. 9 to 12, which show schematic views of the possible implementation types of the reinforcing rib of the present invention. The reinforcing rib 26 is used to reinforce the dental implant guiding sleeve 20, to prevent the dental implant guiding sleeve 20 from being deformed by an applied force to cause shrinkage or expansion. The shape of the reinforcing rib 26 can vary, and the reinforcing rib 26 can be formed on the dental implant guiding sleeve 20 by welding, soldering or directly stamping manner, to achieve the purpose of structural reinforcement.

Figure 13:
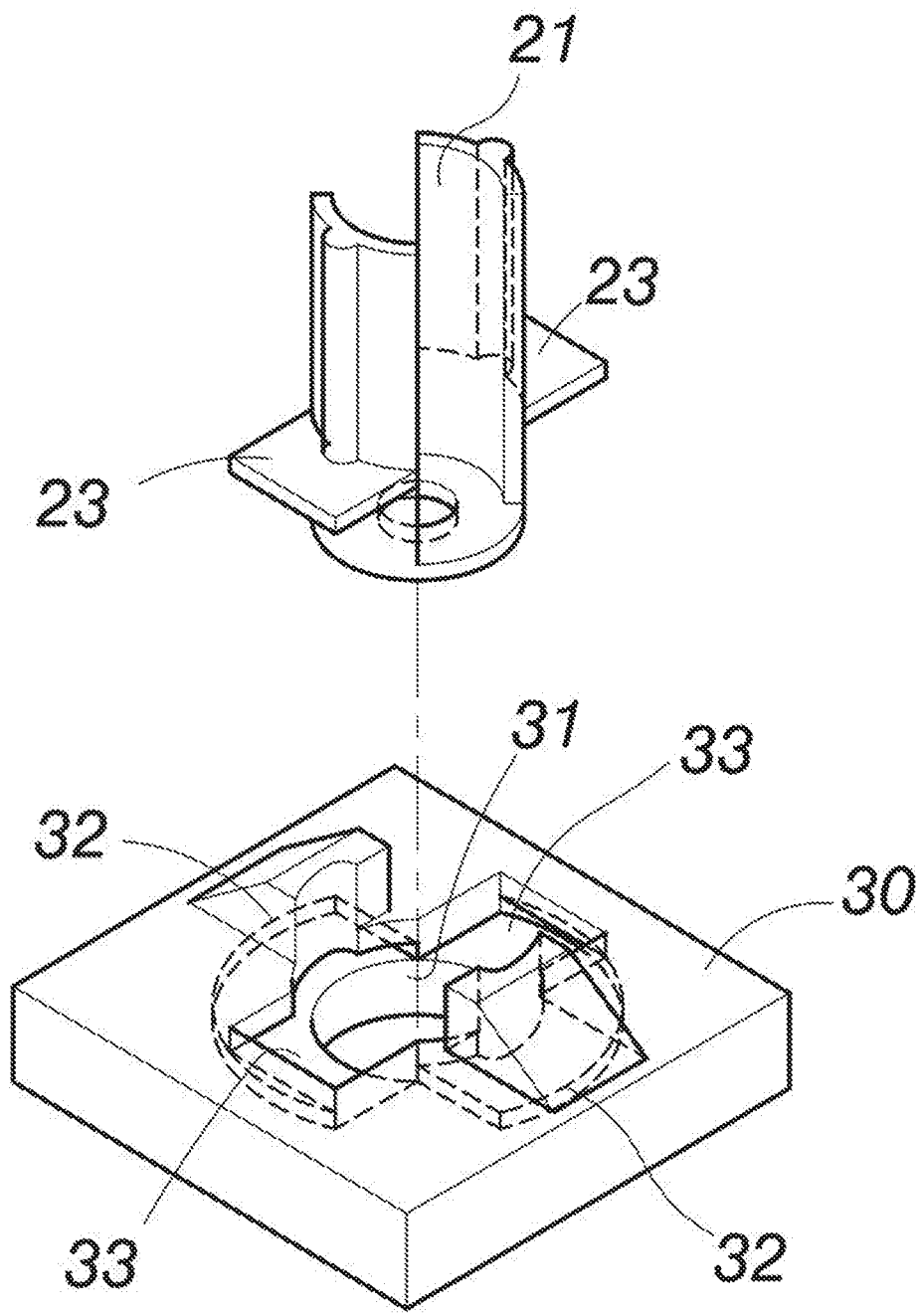
FIG. 13 is an exploded view of a dental implant guiding sleeve and a tooth mold fastening device of a second embodiment of the present invention.
Figure 14:
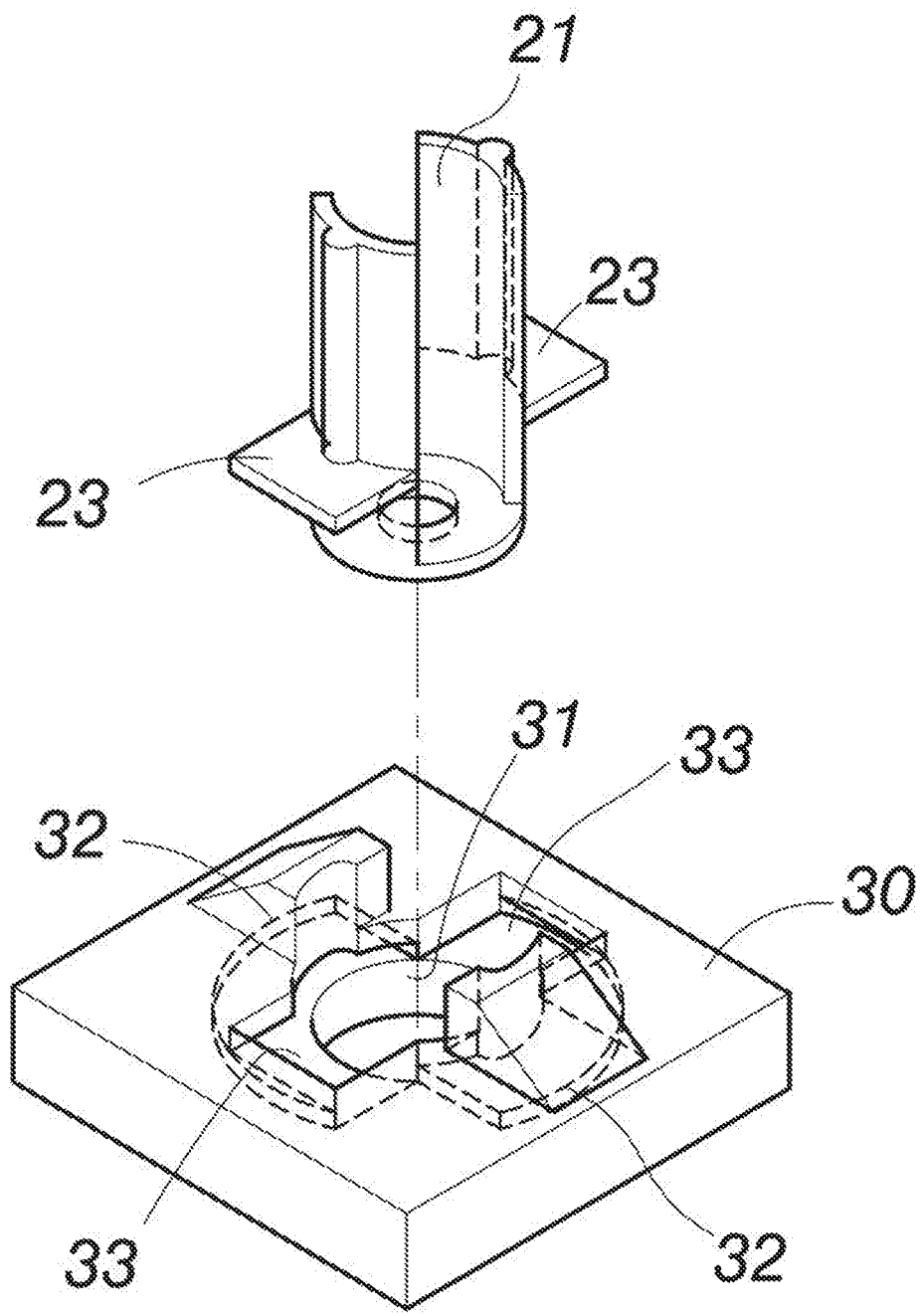
FIG. 14 is an assembled view of the dental implant guiding sleeve and the tooth mold fastening device of the second embodiment of the present invention.

Please refer to FIGS. 13 and 14, which show the structures of the dental implant guiding sleeve 20 and the tooth mold fastening device 30 according to a second embodiment of the present invention. The difference between this embodiment and the first embodiment is that an opening direction of the locating accommodation space 32 formed in the tooth mold fastening device 30 is changed. The tooth mold fastening device 30 has rotary guide grooves 33 formed on an upper surface thereof and corresponding to the locating accommodation spaces 32, respectively, so that the bottom of the dental implant guiding sleeve 20 can be directly inserted into the sleeve hole 31 axially, and in this case, the two locating plates 23 are first inserted into the rotary guide grooves 33 and then screwed into the corresponding locating accommodation spaces 32, so that the dental implant guiding sleeve 20 can be stably fastened in the tooth mold fastening device 30.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A dental implant guiding tool set, comprising:
    a handpiece comprising a handpiece head having a replaceable drill bit and configured to provide the drill bit with driving power, and a connection handle connected to the handpiece head;
    a dental implant guiding sleeve comprising a handpiece head guiding hole having an aperture size corresponding to a shape of the handpiece head and disposed axially, at least one lateral opening formed on a side of the handpiece head guiding hole and corresponding in position to the connection handle, two locating plates disposed radially on two outer sides of the dental implant guiding sleeve respectively, and a position-limiting plate disposed on a bottom of the handpiece head guiding hole and having a drill bit through hole disposed on a center thereof, wherein the handpiece head is located through the handpiece head guiding hole and limited to have the axial displacement only, so that the drilling position of the drill bit is precisely controlled, and wherein the handpiece head contacts the handpiece head guiding hole by a non-rotating outer part thereof, so only sliding friction occurs between the handpiece head and the handpiece head guiding hole during the axial displacement of the handpiece head; and
    a tooth mold fastening device comprising a sleeve hole corresponding to the dental implant guiding sleeve and configured for insertion of the dental implant guiding sleeve, and two locating accommodation spaces formed on two sides of the sleeve hole and corresponding in position to the two locating plates;
    wherein the two locating plates are disposed on different horizontal heights in respect with the position-limiting plate.

2. The dental implant guiding tool set according to claim 1, wherein the dental implant guiding sleeve comprises at least one reinforcing rib disposed on an outer edge thereof.

3. The dental implant guiding tool set according to claim 2, wherein the tooth mold fastening device wraps a partial area of the reinforcing rib.

4. The dental implant guiding tool set according to claim 1, wherein the dental implant guiding sleeve is formed by metal material.

5. A dental implant guiding sleeve comprising:
    a handpiece head guiding hole configured for insertion of a handpiece head, and having an aperture size corresponding to a shape of the handpiece head, wherein the handpiece head is located through the handpiece head guiding hole and limited to have an axial displacement only, so that the drilling position of the drill bit is precisely controlled, and wherein the handpiece head contacts the handpiece head guiding hole by a non-rotating outer part thereof, so only sliding friction occurs between the handpiece head and the handpiece head guiding hole during the axial displacement of the handpiece head;

at least one lateral opening disposed on a side of the handpiece head guiding hole;

a position-limiting plate disposed on a bottom of the handpiece head guiding hole and having a drill bit through hole formed on a center thereof; and two locating plates radially disposed on two outer sides of the dental implant guiding sleeve, respectively;

wherein the two locating plates are disposed on different horizontal heights in respect with the position-limiting plate.

6. The dental implant guiding sleeve according to claim 5, wherein the dental implant guiding sleeve comprises at least one reinforcing rib disposed on an outer edge thereof.

7. The dental implant guiding sleeve according to claim 5, wherein the dental implant guiding sleeve is made by metal material.

\* \* \* \* \*